US 9,248,779 B2

(12) United States Patent
Suzuki et al.

(10) Patent No.: US 9,248,779 B2
(45) Date of Patent: Feb. 2, 2016

(54) MOUNTING STRUCTURE FOR AUTOMOTIVE ROOM LAMP

(75) Inventors: Ken Suzuki, Makinohara (JP);
Takayuki Mizushima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/132,640

(22) PCT Filed: Dec. 3, 2009

(86) PCT No.: PCT/JP2009/070348
§ 371 (c)(1),
(2), (4) Date: Jun. 3, 2011

(87) PCT Pub. No.: WO2010/064691
PCT Pub. Date: Jun. 10, 2010

(65) Prior Publication Data
US 2011/0235352 A1    Sep. 29, 2011

(30) Foreign Application Priority Data

Dec. 4, 2008   (JP) .................................. 2008-310030

(51) Int. Cl.
*B60Q 3/00*      (2006.01)
*B60Q 3/02*      (2006.01)

(52) U.S. Cl.
CPC ..................................... *B60Q 3/0203* (2013.01)

(58) Field of Classification Search
USPC ........................................................ 362/490
See application file for complete search history.

(56) References Cited

U.S. PATENT DOCUMENTS 6,749,324 B2    6/2004  Nagai et al.
7,287,890 B2 *  10/2007 Okabe et al. .................. 362/548

FOREIGN PATENT DOCUMENTS

| CN | 1246171 C    | 3/2006 |
|----|--------------|--------|
| JP | 57-153043 U  | 9/1982 |
| JP | 2001-191844 A| 7/2001 |
| JP | 2001-213233 A| 8/2001 |
| JP | 2002-036948 A| 2/2002 |
| JP | 2002-106532 A| 4/2002 |

(Continued)

OTHER PUBLICATIONS

International Search Report (PCT/ISA/210) issued in Jan. 26, 2010, for PCT/JP2009/070348.

(Continued)

*Primary Examiner* — Nimeshkumar Patel
*Assistant Examiner* — Brenitra M Lee
(74) *Attorney, Agent, or Firm* — Sughrue Mion, PLLC (57) ABSTRACT

A mounting structure including: an outer housing having a first locking portion; a ceiling including a lamp opening portion in a central portion thereof; an inner housing including: a first locking facing portion which is locked in the first locking portion of the outer housing; and a second locking portion on and directly attached to the inner housing; and a reinforcement having a second locking facing portion which is locked on the second locking portion of the inner housing. The ceiling is fixed between the outer housing and the inner housing by locking the first locking facing portion of the inner housing in the first locking portion of the outer housing via the lamp opening portion in the ceiling. A bracket portion shaped so as to follow a shape of an upper side of the ceiling is provided along an outer circumference of the inner housing.

5 Claims, 6 Drawing Sheets

(56) References Cited

FOREIGN PATENT DOCUMENTS

| JP | 2002036948    | * | 6/2002 |
| JP | 2003095018 A  |   | 4/2003 |
| JP | 2007-203911 A |   | 8/2007 |

OTHER PUBLICATIONS

Office Action, dated Nov. 16, 2012, issued by the Korean Intellectual Property Office in counterpart Korean Application No. 10-2011-7012807.

Communication dated Mar. 14, 2013 from the State Intellectual Property Office of P.R. China in counterpart Chinese application No. 2009801488236.

Office Action dated May 6, 2014 issued by the State Intellectual Property Office of P.R. China in corresponding Chinese Application No. 200980148823.6.

Search Report, Issued by the European Patent Office, Dated Oct. 28, 2014, in counterpart European application No. 09830457.9.

Office Action, dated Oct. 21, 2013, issued by the State Intellectual Property Office of P.R. China in counterpart Chinese Patent Application No. 200980148823.6.

* cited by examiner

MOUNTING STRUCTURE FOR AUTOMOTIVE ROOM LAMP

TECHNICAL FIELD

The present invention relates to a mounting structure for an automotive room lamp and particularly to a mounting structure for the automotive room lamp which is made lighter in weight.

BACKGROUND ART

Conventionally, a conventional mounting structure for use in mounting a room lamp in a ceiling of a passenger compartment has been known. In the conventional mounting structure, a head lining constituting a ceiling is installed onto an inner side of a roof panel, and an room lamp is installed in a lamp installation hole provided in the head lining from below (refer to Patent Documents 1 and 2).

CITATION LIST

Patent Document

[Patent Document 1] JP-A-2002-36948
[Patent Document 2] JP-A-2001-213233

Figure 6A:
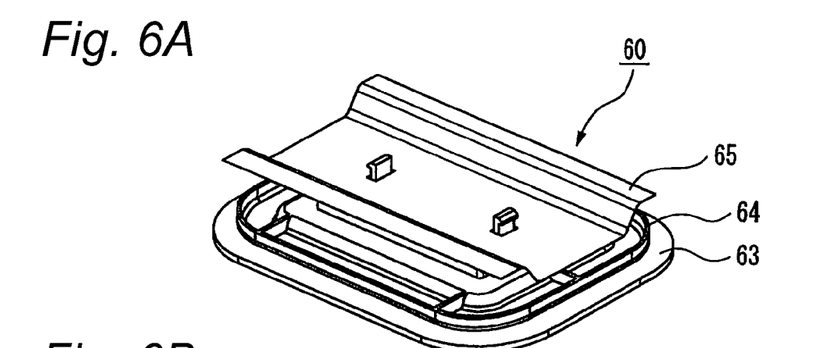
FIG. 6A is an overall perspective view of the conventional mounting structure for the automotive room lamp which has been fabricated.
Figure 6B:
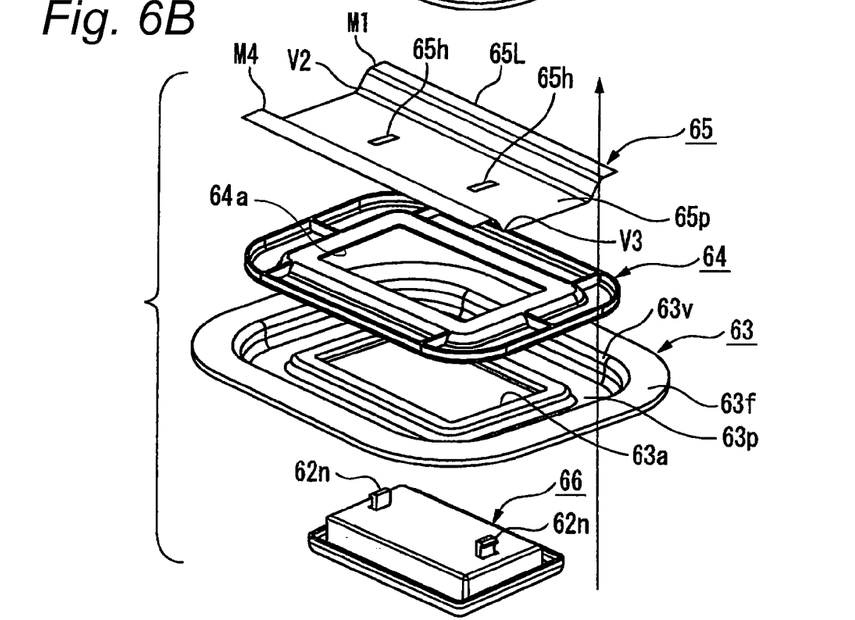
Figure 6C:
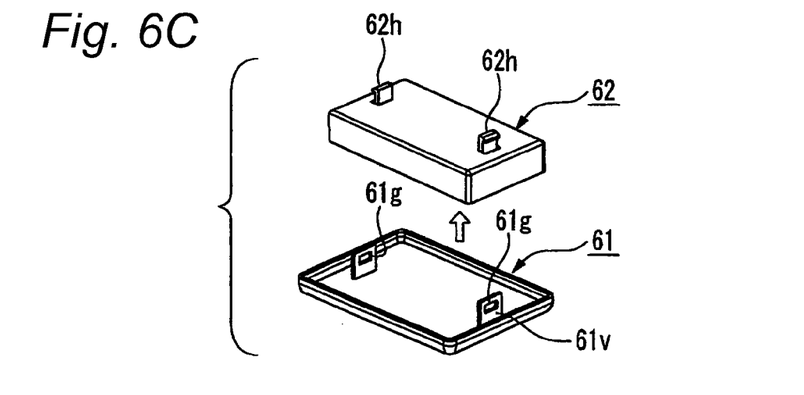
FIG. 6C is an exploded perspective view of a lamp assembly in FIG. 6B.

FIGS. 6A to 6C shows exploded perspective views depicting a conventional mounting structure for an automotive room lamp. FIG. 6A is an overall perspective view of a conventional mounting structure that has been fabricated FIG. 6B is an exploded perspective view of the mounting structure shown in FIG. 6A. FIG. 6C is an exploded perspective view of a lamp assembly which is shown in a lowest position in FIG. 6B.

In FIGS. 6A to 6C, reference numeral 60 (FIG. 6A) denotes a conventional mounting structure for the automotive room lamp. This mounting structure for the automotive room lamp 60 is disassembled into, as is shown in FIG. 6B, a reinforcement 65, a bracket 64, a ceiling 63 and a lamp assembly 66 sequentially in that order from top.

Further, the lamp assembly 66 is disassembled into an inner housing 62 and an outer housing 61 as is seen in FIG. 6C.

Hereinafter, the individual constituent elements of the conventional mounting structure for the automotive room lamp will be described.

<Conventional Outer Housing 61>

The outer housing 61 is a resin member which performs as a lens which transmits lamp light from a lamp function portion of the inner housing 62. This outer housing 61 includes erected members 61v which include lock locking holes 61g which lock therein lock claws on the inner housing 62.

<Conventional Inner Housing 62>

The inner housing 62 is configured as a hollow rectangular parallelepiped body having no bottom in an interior of which the lamp function portion is accommodated. This inner housing 62 includes in the interior thereof the lock claws which are locked in the corresponding locking holes 61g in the outer housing 61. In addition, a plurality of (two in the figure) lock claws 62h, which are brought into engagement with lock locking holes 65h (which will be described later) in the reinforcement 65, are provided on an upper outer side of the inner housing 62 in positions which correspond to the lock locking holes 65h in the reinforcement 65.

<Conventional Ceiling 63>

The ceiling 63 is made up of a resin member having a rectangular shape when viewed from thereabove which constitutes literally a ceiling portion when an automotive room lamp is mounted to an upper portion in the passenger compartment. This ceiling 63 includes a flat bottom surface portion 63p at a central portion, a wall surface portion 63v which is erected around a circumference of the bottom surface portion and a flange portion 63f which extends outwards horizontally from the wall surface portion 63v. A lamp opening portion 63a, through which the inner housing 62 having the rectangular parallelepiped configuration is passed, is opened in a center of the bottom surface portion 63p.

<Conventional Bracket 64>

The bracket 64 is a reinforcement member which increases the strength of the ceiling 63 when the ceiling 63 is installed onto the reinforcement 65. This bracket 64 has partially the same configuration as a back-side configuration of the ceiling 63. Therefore, the bracket 64 can firmly be fixed to a back side of the ceiling 63 with an adhesive for example. A lamp opening portion 64a, which has the same size as the lamp opening portion 63a, is opened in a center of the bracket 64 so as to allow the inner housing 62 having the rectangular parallelepiped configuration to pass therethrough.

In the present invention, an inner housing is devised so as to eliminate the use of this bracket 64. Therefore, the step of fixing the bracket 64 with the adhesive can be omitted.

<Conventional Reinforcement 65>

The reinforcement 65 is a member which supports the automotive room lamp in whole. Because of this, the reinforcement 65 is installed onto a frame of the motor vehicle which lies on the back side of the ceiling. The reinforcement 65 is a bent plate having a flat bottom surface 65p at a bottom thereof which is formed by bending a piece of rectangular sheet metal in such a way as to bend it from a side 65L sequentially externally (M1), internally (V2), internally (V3), and externally (M4) every time the sheet metal extends a predetermined distance from the side 65L towards the other side and in parallel with the side 65L. A plurality of lock locking holes 65h (two locations in the figure) are opened in the bottom surface 65p. The automotive room lamp mounting structure 60 is built up completely by the lock claws 62h on the inner housing 62 being locked in the lock locking holes 65h.

As described above, the lamp assembly 66 is formed by locking the lock claws of the inner housing 62 in the lock locking holes 61g in the outer housing 61, and the ceiling assembly is formed by bonding the bracket 64 to the back side of the ceiling 63 with the adhesive.

In this way, the conventional automotive room lamp mounting structure 60 is made up of the outer housing 61, the inner housing 62, the ceiling 63, the bracket 64 and the reinforcement 65 which are arranged sequentially in that order from the bottom.

SUMMARY OF INVENTION

Technical Problem

<Problems of Conventional Mounting structure for Automotive Room Lamp>

The applicant of this patent application notices that in the component members making up the conventional mounting structure for the automotive room lamp 60, the bracket 64 as the reinforcement member constitutes a factor which increases the fabrication cost of the same construction. Moreover, the bracket 64 also constitutes a factor which increases the weight of the same construction. Further, one step is added in which the ceiling assembly is formed by bonding the bracket 64 to the back side of the ceiling 63 with the adhesive, which affects the productivity of the same construction.

The present invention is made for solving the problems. An object of the invention is to provide a mounting structure for an automotive room lamp which reduces the fabrication cost and weight thereof and provides good productivity by being devised so as not to use the bracket 64.

Solution to Problem

With a view to attaining the object, according to a first invention, there is provided an automotive room lamp mounting structure, comprising sequentially in the following order from bottom:

an outer housing having a first locking portion;

a ceiling including a lamp opening portion in a central portion thereof;

an inner housing having a first locking facing portion which is locked in the first locking portion of the outer housing and a second locking portion; and a reinforcement having a second locking facing portion which is locked on the second locking portion of the inner housing, wherein the ceiling is fixed between the outer housing and the inner housing by locking the first locking facing portion of the inner housing in the first locking portion of the outer housing via the lamp opening portion in the ceiling, and wherein a bracket portion shaped so as to follow a shape of an upper side of the ceiling is provided along an outer circumference of the inner housing.

By configuring the mounting structure for the automotive room lamp in the way described above, the bracket used as the independent member in the conventional construction is eliminated. Instead, the bracket portion is formed along the outer circumference of the inner housing, whereby the step can be eliminated in which the conventional bracket as the independent member is bonded to the back side of the ceiling with the adhesive, thereby making it possible to contribute to reduction in fabrication cost and increase in productivity.

Further, since the bracket portion of the inner housing is shaped so as to follow the shape of the upper side of the ceiling, the bracket portion is brought into abutment with the upper side of the ceiling, whereby not only is bagginess in the ceiling prevented, but also the strength of the ceiling is increased.

According to a second invention, there is provided the mounting structure for the automotive room lamp as set forth in the first invention, wherein the ceiling includes a bottom surface portion which connects to the lamp opening portion in the central portion so as to extend outwards therefrom, a wall surface portion erected along an outer circumference of the bottom surface portion, and a flange portion which extends outwards horizontally from the wall surface portion.

By configuring the mounting structure for the automotive room lamp in the way described above, since irregularities are formed, the strength of the ceiling can be increased, and similarly the strength of the bracket of the inner housing can also be increased.

According to a third invention, there is provided the mounting structure for the automotive room lamp as set forth in the first invention, wherein a lock protection member having a height higher than the first locking portion of the outer housing is erected in proximity to the first locking portion.

By configuring the mounting structure for the automotive room lamp in the way described above, there is made no damage to the erected member, which can largely contribute to increasing productivity.

According to a fourth invention, there is provided the mounting structure for the automotive room lamp as set forth in the third invention, wherein the lock protection member has a thickness which is thicker than the first locking portion.

By configuring the mounting structure for the automotive room lamp in the way described above, the strength of the lock protection member can be increased and hence the possibility of occurrence of damage to the erected member is reduced further, which can largely contribute to increasing productivity.

According to a fifth invention, there is provided the mounting structure for the automotive room lamp as set forth in the third invention, wherein the lock protection member comprises a reinforcement rib.

By configuring the mounting structure for the automotive room lamp in the way described above, the strength of the lock protection member can be increased and hence the possibility of occurrence of damage to the erected member is reduced further, which can largely contribute to increasing productivity.

Advantageous Effects of Invention

Thus, as described above, according to the invention, the bracket used as the independent member in the conventional construction is eliminated. Instead, the bracket portion is formed along the outer circumference of the inner housing, whereby the step can be eliminated in which the conventional bracket as the independent member is bonded to the back side of the ceiling with the adhesive, thereby making it possible to contribute to reduction in fabrication cost and increase in productivity.

Further, not only can bagginess in the ceiling be prevented, but also the strength of the ceiling can be increased.

In addition, no damage is made to the erected member by providing the lock protection member, which can largely contribute to increasing productivity.

BRIEF DESCRIPTION OF DRAWINGS

FIGS. 2A and 2B show exploded perspective views of the mounting structure for the automotive room lamp according to the invention.

FIGS. 5A to 5D show perspective views depicting individually an inner housing and an outer housing according to Embodiment 2.

FIGS. 6A to 6C show an exploded perspective views depicting a conventional mounting structure for an automotive room lamp. FIG. 6B is an exploded perspective view of the mounting structure for the automotive room lamp in FIG. 6A.

DESCRIPTION OF EMBODIMENTS

Hereinafter, a mounting structure for an automotive room lamp according to the present invention will be described.

Figure 1:
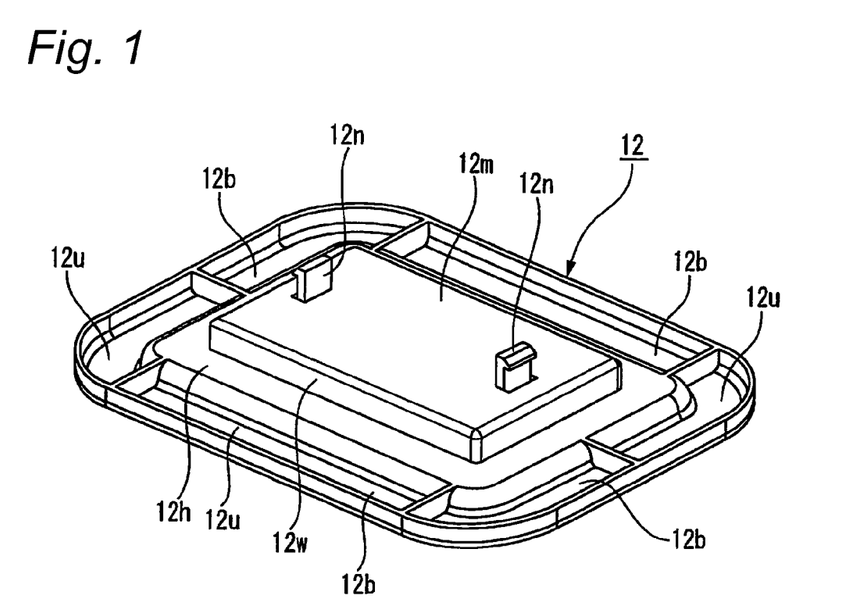
FIG. 1 is a perspective view showing an inner housing of a mounting structure for an automotive room lamp according to Embodiment 1 of the invention.

FIG. 1 is a perspective view showing an inner housing of a mounting structure for an automotive room lamp according to Embodiment 1 of the present invention.

<Embodiment 1: Configuration of Inner Housing>

FIG. 1 is a perspective view showing the configuration of an inner housing. In FIG. 1, reference numeral 12 denotes an inner housing according to Embodiment 1 of the invention. This inner housing 12 is a resin member made up of a main body portion 12m having a hollow rectangular parallelepiped shape which accommodates a lamp function portion in an interior thereof and a bracket portion 12b which surrounds an outer circumference of the main body portion 12m.

The main body portion 12m includes in an interior thereof lock claws 12g (refer to FIG. 4C) which are locked in locking holes 11g (refer to FIG. 2B) in an outer housing 11 (refer to FIG. 2B) and a plurality of (two in FIG. 1) lock claws 12n which are brought into engagement with lock locking holes 15h in a reinforcement 15 in positions which correspond to the lock locking holes 15h in the reinforcement 15 on an upper outer side thereof. The configuration of the main body portion 12m is the same as that of the conventional inner housing 62 (refer to FIG. 6C).

In addition, the invention is characterized in that the bracket portion 12b is formed integrally with the outer circumference of the inner housing 12. The bracket portion 12b includes a horizontal portion 12h which extends horizontally from side walls 12w on four sides of the main body portion 12m and a U-shaped groove 12u which is situated at a distal end of the horizontal portion 12h. The horizontal portion 12h and the U-shaped groove 12u are brought into abutment with a bottom surface portion 13p of a ceiling 13 to thereby prevent the occurrence of bagginess in the ceiling 13. This contributes to increasing the strength of the ceiling.

<Installing Position of Inner Housing 12>

Next, where in the mounting structure for the automotive room lamp and how the inner housing 12 according to Embodiment 1 is installed will be described.

Figure 2A:
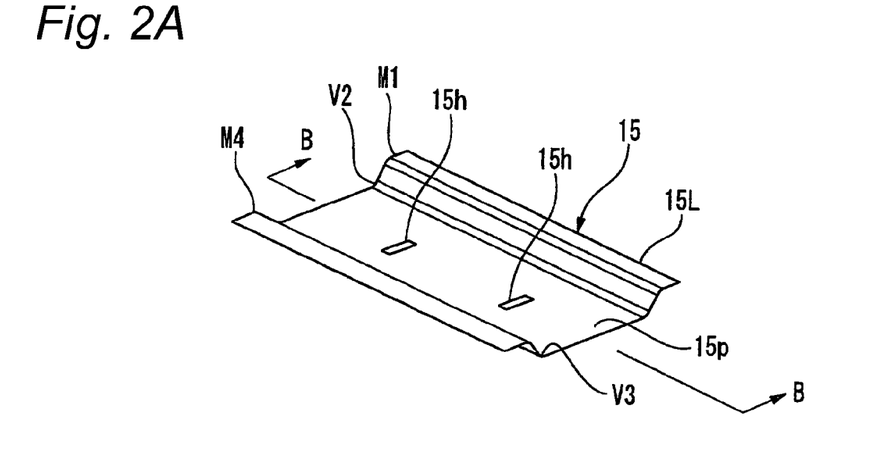
FIG. 2A is a perspective view of a reinforcement.
Figure 2B:
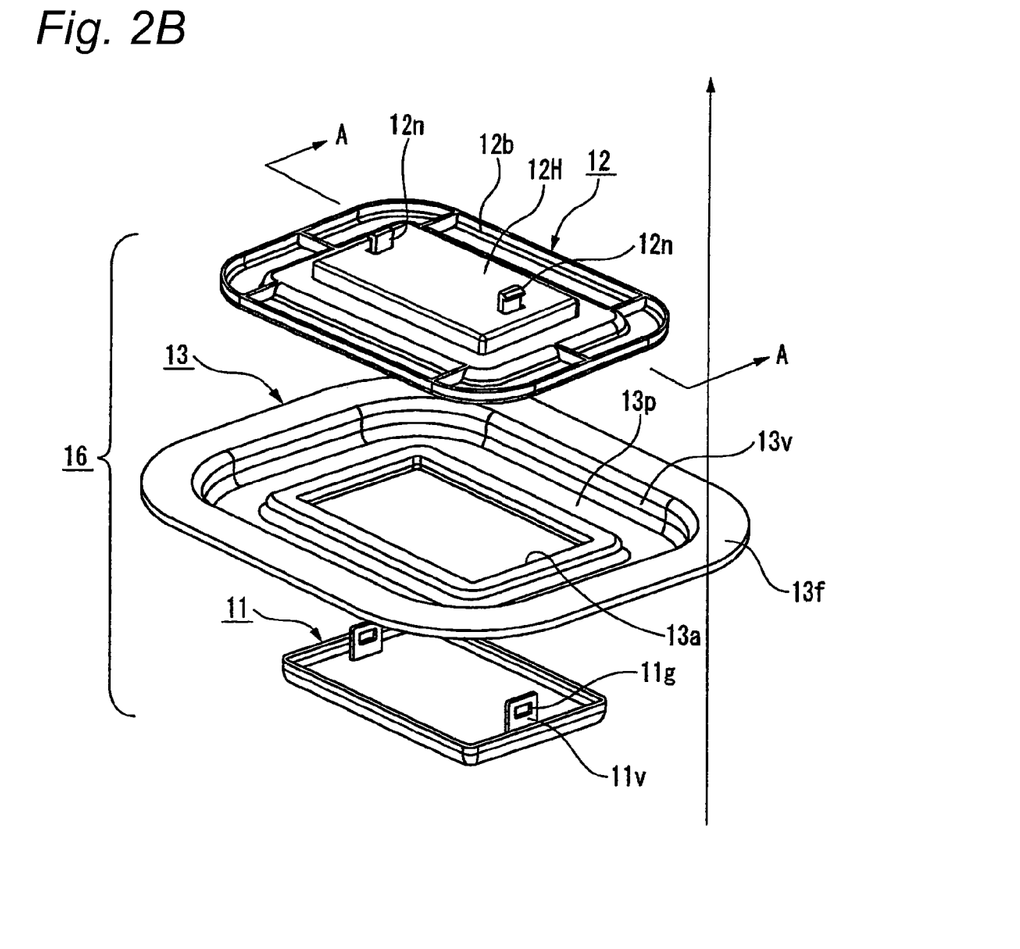
FIG. 2B is an exploded perspective view of the mounting structure for the automotive room lamp which is mounted onto the reinforcement.

FIGS. 2A and 2B show exploded perspective views of the mounting structure for the automotive room lamp according to the invention. FIG. 2A is a perspective view of the reinforcement having the same configuration as that of the conventional reinforcement. FIG. 2B is an exploded perspective view of the mounting structure for the automotive room lamp that is mounted onto the reinforcement.

Shown in FIGS. 2A and 2B sequentially from bottom are the outer housing 11, the ceiling 13, the inner housing 12 according to the invention, and the reinforcement 15.

When comparing FIGS. 2A and 2B with FIGS. 6A to 6C which show the conventional mounting structure, it is found that the bracket 64 which is used in the conventional mounting structure is not shown in FIGS. 2A and 2B. Further, it is found that in FIG. 2B, the inner housing 12 is positioned above the ceiling 13 and the flange portion 12b of the inner housing 11 is in abutment with the ceiling 13, whereas in FIGS. 6A to 6C, the inner housing is positioned below the ceiling. The flange portion 12b of the inner housing 12 shown in FIG. 2B reinforces the ceiling 13 to thereby prevent the occurrence of bagginess in the ceiling 13.

The outer housing 11, the ceiling 13 and the reinforcement 15 will be described as follows.

<Outer Housing 11>

The outer housing 11 is a resin member having a rectangular shape when viewed from thereabove which performs as a lens which transmits lamp light from the lamp function portion of the inner housing 12. Elongate rectangular erected members 11v are erected at central portions of two sides so as to face each other. The lock locking holes 11g, which lock therein the lock claws 12g (refer to FIG. 4C) of the inner housing 12, are provided in upper portions of the erected members 11v.

<Ceiling 13>

The ceiling 13 is made up of a resin member having a rectangular shape when viewed from thereabove which constitutes literally a ceiling portion when an automotive room lamp is mounted in an upper portion in a passenger compartment. The ceiling 13 includes the flat bottom surface portion 13p at a central portion, a wall surface portion 13v which is erected around a circumference of the bottom surface portion 13p and a flange portion 13f which extends outwards horizontally from the wall surface portion 13v. A lamp opening portion 13a, through which the inner housing 12 having the rectangular parallelepiped shape is passed, is opened in a center of the bottom surface portion 13p. The bottom surface portion 13p, the wall surface portion 13v and the flange portion 13f are formed light in weight and thin in thickness and extend outwards over a wide range and therefore are not strong in terms of strength.

<Reinforcement 15>

The reinforcement 15 is such as to support a lamp apparatus in whole. The reinforcement 15 is installed onto a frame of the motor vehicle which lies on a back side of the ceiling. The reinforcement 15 is a bent plate having a bottom surface 15p at a bottom thereof which is formed by bending a piece of rectangular sheet metal in such a way as to bend it from a side 15L sequentially externally (M1), internally (V2), internally (V3), and externally (M4) every time the sheet metal extends a predetermined distance from the side 15L towards the other side and in parallel with the side 15L. A plurality of lock locking holes 15h (two locations in FIG. 2) are opened in the protruding bottom surface 15p. The automotive room lamp mounting structure 10 is completed when the lock claws 12n on the inner housing 12 are locked in the lock locking holes 15h.

Figure 3:
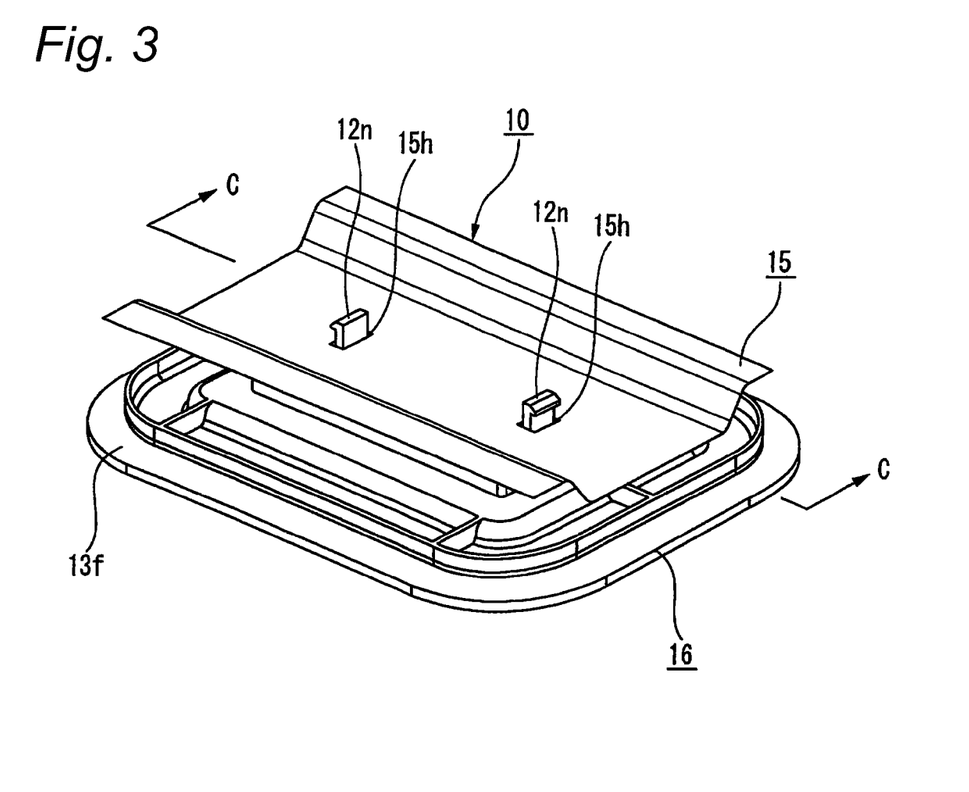
FIG. 3 is an overall perspective view of the automotive room lamp according to the invention which is built up by assembling together all the constituent members shown in FIGS. 2A and 2B.

FIG. 3 is an overall perspective view of an automotive room lamp according to the invention. Namely, when the constituent members shown in FIGS. 2A and 2B are assembled together, the automotive room lamp shown in FIG. 3 is built up.

The mounting structure 10 for the automotive room lamp includes the outer housing 11, the ceiling 13, the inner housing 12 and the reinforcement 15 sequentially in that order from bottom. In this way, since the bracket 64 used in the conventional mounting structure is eliminated from FIG. 3, a step can be omitted of bonding the bracket portion to a back side of the ceiling 13 with an adhesive. Consequently, the invention contributes to reduction in fabrication cost and increase in productivity. Moreover, since the bracket portion 12b of the inner housing 12 includes the reinforcement function possessed by the conventional bracket 64 (refer to FIGS. 6A and 6B), the ceiling 13 can also be reinforced.

Next, a procedure of assembling together these constituent members will be described by use of FIGS. 4A to 4C.

<Assembling Procedure>

Figure 4A:
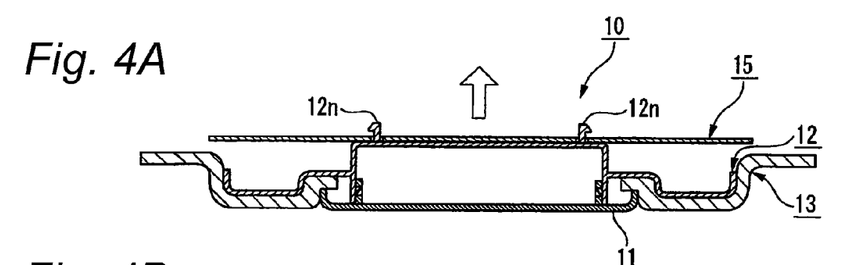
FIG. 4 shows sectional views showing a procedure of assembling the constituent members shown in FIG. 2B, according to which assemblage is progressed in the order from FIG. 4C to FIG. 4A.
Figure 4B:
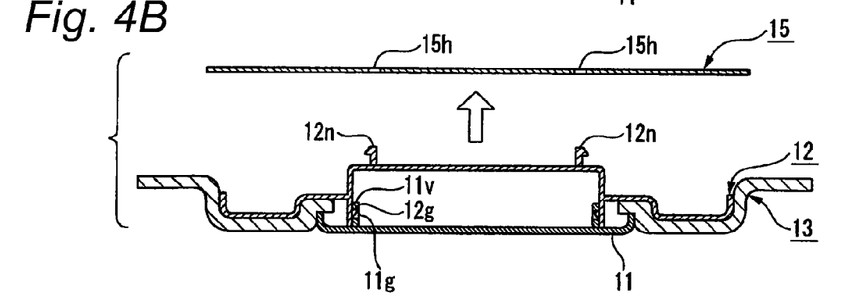
Figure 4C:
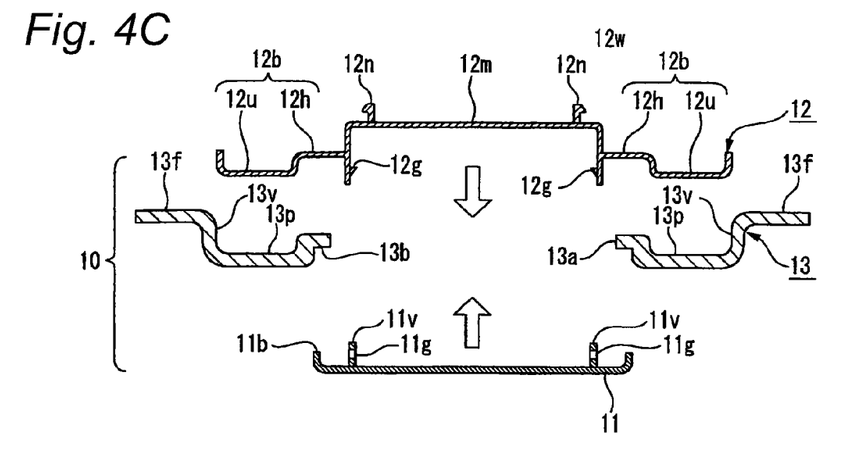

FIGS. 4A to 4C show sectional views showing a procedure of assembling the constituent members shown in FIGS. 2A and 2B, according to which assemblage is progressed in the order from FIG. 4C to 4A.

FIG. 4C is a sectional view taken along the line A-A and viewed in a direction indicated by arrows A in FIG. 2B.

When looking at a sectional shape of the ceiling 13 taken along the line A-A, the sectional shape of the ceiling 13 taken along the line A-A takes such a shape that the bottom surface portion 13p sinks from a circumferential edge portion 13b which forms the lamp opening portion 13a in the central portion to extend to the erected wall surface portion 13v and the flange portion 13f extends outwards horizontally from the wall surface portion 13v.

On the other hand, the outer housing 11 includes the lock locking holes 11g which lock the lock claws 12g on the inner housing 12 in the erected members 11v and also includes erected walls 11b which are erected upwards from circumferential edge portions of four sides thereof.

Further, the inner housing 12 includes on an inner side of the main body portion 12m the lock claws 12g which each have a downward sloping surface portion so that the lock claws 12g can be locked in the lock locking holes 11g in the outer housing 11. In addition, the inner housing 12 includes the two lock claws 12n on the upper outer side of the main body portion 12m so that the lock claws 12n can be brought into engagement with the lock locking holes 15h in the reinforcement 15.

In addition, the bracket portion 12b along the outer circumference of the inner housing 12 includes the horizontal portion 12h and the U-shaped groove 12u at the distal end of the horizontal portion 12h. The sectional shape of the bracket portion 12b partially coincides with the configuration of the upper surface (the back side) of the ceiling 13.

FIG. 4B is the sectional view which corresponds to the perspective views of FIGS. 2A and 2B. The reinforcement 15 is shown as a sectional view taken along the line B-B and viewed in a direction indicated by arrows B in FIG. 2A.

In FIG. 4C, when the ceiling 13 is held from therebelow by the outer housing 11 and from thereabove by the inner housing 12, since the lock locking holes 11 g in the outer housing 11 lock therein the lock claws 12g on the inner housing 12, the circumferential edge portion 13b of the ceiling 13 which is held therebetween is held and supported by head portions of the erected walls 11 b of the outer housing 11 and the horizontal portion 12h of the bracket portion 12b of the inner housing 12.

Further, the bottom surface portion 13p and the wall surface portion 13v of the ceiling 13 are brought into abutment with the U-shaped groove 12u at the distal end of the horizontal portion 12h of the bracket portion 12b of the inner housing 12 which is provided according to the invention, whereby the occurrence of bagginess in the ceiling 13 is prevented so as to increase the strength of the ceiling.

Next, the reinforcement 15 is locked.

FIG. 4A is a sectional view taken along the line C-C and viewed in a direction indicated by arrows C in FIG. 3.

In FIG. 4A, the lock claws 12n on the inner housing 12 are locked in the lock locking holes 15h in the reinforcement 15, whereby the mounting structure 10 for the automotive room lamp (FIG. 2A) is completed.

<Advantage of Embodiment 1>

As is seen from FIG. 4A, according to Embodiment 1 of the invention, the bracket 64 (FIGS. 6A and 6B) used as the independent member in the conventional mounting structure is eliminated and instead the bracket portion 12b is formed with the outer circumference of the inner housing 12. Thus, the step can be omitted of bonding the conventional independent member to the back side of the ceiling with the adhesive. Consequently, the invention contributes to reduction in fabrication cost and increase in productivity.

In addition, since no abutment surface for positioning is required at the opening portion in the ceiling, there is no risk of damaging the opening portion in the ceiling.

Further, the bottom surface portion 13p and the wall surface portion 13v of the ceiling 13 are brought into abutment with the bracket portion 12b of the inner housing 12, whereby the occurrence of bagginess in the ceiling 13 can be prevented so as to increase the strength of the ceiling. Although the art described in Patent Document 1 is also the art which eliminates the bracket, since the art concerned loses the function possessed by the conventional bracket, the occurrence of bagginess in the ceiling cannot be prevented.

In the present invention, the configuration described above is employed, therefore the bagginess in the ceiling 13 is prevented so as to increase the strength of the ceiling.

Nest, Embodiment 2 of the invention will be described.

<Embodiment 2: Improvement in Outer Housing>

Embodiment 2 relates to an improvement in the outer housing of Embodiment 1.

Figure 5A:
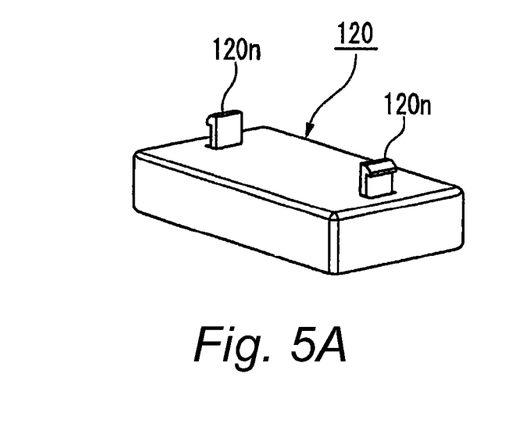
FIG. 5A is a perspective view of the inner housing as viewed in one direction.
Figure 5B:
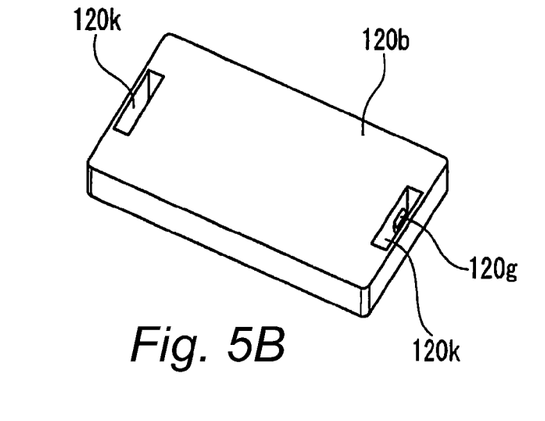
FIG. 5B is a perspective view of the inner housing as viewed by turning it upside down.
Figure 5C:
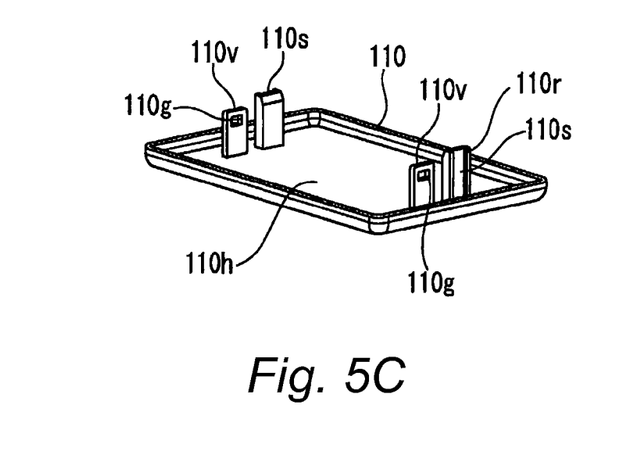
FIG. 5C is a perspective view of the outer housing as viewed from one direction.
Figure 5D:
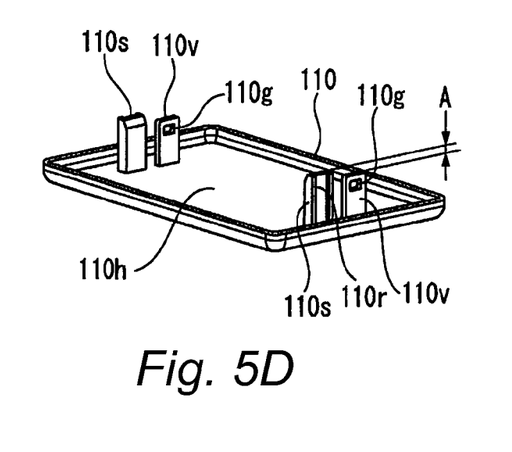
FIG. 5D is a perspective view of the outer housing as viewed from the other side.

FIGS. 5A to 5D show perspective views depicting individually an inner housing and an outer housing according to Embodiment 2. FIG. 5A is a perspective view of the inner housing as viewed in one direction, and FIG. 5B is a perspective view of the inner housing as viewed by turning it upside down. FIG. 5C is a perspective view of the outer housing as viewed from one direction, and FIG. 5D is a perspective view of the outer housing as viewed from the other side.

<Configuration of Outer Housing 110>

An outer housing 110 is a resin member having a rectangular shape when viewed from thereabove. In the outer housing 110, elongate erected members 110v are erected at central portions of two sides of a rectangular bottom surface 110h which performs as a lens which transmits lamp light from a lamp function portion of an inner housing 120. Lock locking holes 110g, which are adapted to lock therein lock claws 120g (FIG. 5B) on the inner housing 120, are provided in upper portions of the erected members 110V. These configurations are the same as those of Embodiment 1.

The outer housing 110 of Embodiment 2 differs from that of Embodiment 1 in that lock protection members 110s, which will be described below, are provided in proximity to the erected members 110v. Namely, the protection member 110s is higher by A mm than a height of the erected member 110v. Moreover, vertically extending reinforcement ribs 110r are formed on the protection member 110s, and the thickness of the protection member 110s is made thicker than that of the erected member 110v. Thus, the protection member 110s is made more rigidly and strongly than the erected member 110v in whole.

<Configuration of Inner Housing 120>

The inner housing 120 is, as is shown in FIG. 1, made up of a main body portion and a bracket portion lying along an outer circumference of the main body portion. In FIGS. 5A to 5D, to make it easy to look at the inner housing according to Embodiment 2, only the main body portion 120m is shown with the bracket portion along the outer circumference of the inner housing omitted. In FIGS. 5A and 5B, the inner housing 120 includes two lock claws 120n, which are adapted to be locked in lock locking holes 15h in a reinforcement 15 (FIG. 2B), on an upper outer side thereof in positions which correspond to the lock locking holes 15h. Further, the inner housing 120 includes lock claws 120g, adapted to be locked in the lock locking holes 110g formed in the erected members 110v on the outer housing 110, which are formed on inner walls of recess portions 120k provided in a bottom portion 120b so as to be oriented inwards of the recess portions.

<Assemblage of Both Housings 110, 120>

When the erected members 110v and the protection members 110s on the outer housing 110 are inserted into the recess portions 120k provided in the bottom portion 120b of the inner housing 120, the protection members 110s come into contact with constituent components within the inner housing 120 and proceeds further inwards to guide the erected members 110v while protecting the erected members 110v.

Then, finally, the lock claws 120g on the inner housing 120 are locked in the lock locking holes 110g in the erected members 110v on the outer housing 110, whereby the assemblage of both the housings is completed.

In this case, locking holes or lock claws are formed in or at distal ends of the protection members 110s, while mating locking mechanisms (lock claws or locking holes) are formed at corresponding portions within the inner housing 120, whereby a double locking mechanism can be provided.

<Advantage of Embodiment 2>

According to Embodiment 2 configured in the way described above, since the lock protection members 110s which are made more rigidly and strongly than the erected members 110v are provided in proximity to the erected members 110v, even when the erected members 110v on the outer housing 110 are inserted into the recess portions 120k in the inner housing 120, the protection members 110s bear all impacts produced when they come into contact with the constituent components within the inner housing 120. Namely, since the protection members 110s play a role of a protector, the erected members 110v standing thereby proceed while being protected by the protection members 110s. Because of this, the lock claws 120g on the inner housing 120 can be locked in the lock locking holes 110g in the erected members 110v without damaging the erected members 110v. Thus, the assemblage of both the housings is completed with no problem.

In the conventional mounting structure and Embodiment 1, since these lock protection members 110s are not provided, when the erected members 110v are inserted into the inner housing 120, the erected members 110v bear all impacts that are produced when they come into contact with the constituent members within the inner housing 120 since the lock protection members 110s are not provided. Consequently, there are fears that the erected members 110v are damaged before they fit into the inner housing 120. However, according to Embodiment 2, since there are no fears that the erected members 110v are damaged, Embodiment 2 can largely contribute to increasing productivity.

The lock protection members 110s also perform to position the outer housing 110 with respect to the inner housing 120.

Thus, according to the invention, the bracket 64 (FIGS. 6A and 6B) used as the independent member in the conventional mounting structure is eliminated, and instead the bracket portion 12b is formed along the outer circumference of the inner housing 12, whereby the step can be omitted of bonding the bracket, which is the conventional independent member, to the back side of the ceiling with the adhesive. Thus, the invention contributes to reduction in fabrication cost and increase in productivity.

Further, by bringing the bottom surface portion 13p and the wall surface portion 13v of the ceiling 13 into abutment with the bracket portion 12b of the inner housing 12, the occurrence of bagginess in the ceiling 13 can be prevented to thereby increase the strength of the ceiling.

In addition, since the damage to the erected members 110v can be prevented by providing the lock protection members 110s, the invention contributes largely to increasing productivity.

REFERENCE SIGNS LIST 10 mounting structure for automotive room lamp 11 outer housing
11b erected wall
11g lock locking hole
12m main body portion
11v erected member
12 inner housing
12b bracket portion
12g lock claw
12h horizontal portion
12m main body portion
12n lock claw
12u U-shaped groove
12w side wall
13 ceiling
13a lamp opening portion
13f flange portion
13p bottom surface portion
13v wall surface portion
15 reinforcement
15h lock locking hole
15p bottom surface
15L side of metal sheet
M1, M3 external bending
V2, V4 internal bending
110 outer housing
110g lock locking hole
110h rectangular bottom surface
110s lock protection member
110r reinforcement rib
110v erected member
120 inner housing
120b bottom portion
120k recess portion
120g lock claw
120n lock claw

The invention claimed is:

1. A mounting structure for an automotive room lamp, the mounting structure comprising sequentially in the following order from bottom:
   an outer housing having a first locking portion;
   a ceiling including a lamp opening portion in a central portion thereof;
   an inner housing including:
      a first locking facing portion which is locked in the first locking portion of the outer housing; and
      a second locking portion on and directly attached to the inner housing; and
   a reinforcement having a second locking facing portion which is locked on the second locking portion of the inner housing,
   wherein the ceiling is fixed between the outer housing and the inner housing by locking the first locking facing portion of the inner housing in the first locking portion of the outer housing via the lamp opening portion in the ceiling, and
   wherein a bracket portion shaped so as to follow a shape of an upper side of the ceiling is provided along an outer circumference of the inner housing.

2. The mounting structure for the automotive room lamp as set forth in claim 1, wherein the ceiling further includes a bottom surface portion which connects to the lamp opening portion in the central portion so as to extend outwards therefrom;
   a wall surface portion erected along an outer circumference of the bottom surface portion; and
   a flange portion which extends outwards horizontally from the wall surface portion.

3. The mounting structure for the automotive room lamp as set forth in claim 1, wherein a lock protection member having a height higher than the first locking portion of the outer housing is erected in proximity to the first locking portion.

4. The mounting structure for the automotive room lamp as set forth in claim 3, wherein the lock protection member has a thickness which is thicker than the first locking portion.

5. The mounting structure for the automotive room lamp as set forth in claim 3, wherein the lock protection member includes a reinforcement rib.

\* \* \* \* \*